United States Patent [19]

Svoboda et al.

[11] 4,417,001

[45] Nov. 22, 1983

[54] LOW SMOKE ISOCYANURATE MODIFIED URETHANE FOAM AND METHOD OF MAKING SAME

[75] Inventors: Glenn R. Svoboda, Grafton; William L. Carlstrom; Richard T. Stoehr, both of West Bend, all of Wis.

[73] Assignee: Freeman Chemical Corporation, Port Washington, Wis.

[21] Appl. No.: 419,748

[22] Filed: Sep. 20, 1982

[51] Int. Cl.$^3$ ............................................... C08J 9/02
[52] U.S. Cl. ..................................... 521/114; 521/116
[58] Field of Search ................................ 521/114, 116

[56] References Cited

U.S. PATENT DOCUMENTS

| | | | |
|---|---|---|---|
| 4,035,313 | 7/1977 | Falkenstein et al. | 521/164 X |
| 4,039,487 | 8/1977 | Kolakowski et al. | 521/114 X |
| 4,115,300 | 9/1978 | Chakirof | 521/114 X |
| 4,223,068 | 9/1980 | Carlstrom et al. | 428/310 |
| 4,233,408 | 11/1980 | Satterly et al. | 521/172 |
| 4,251,635 | 2/1981 | Stone | 521/172 X |
| 4,336,341 | 6/1982 | Fujiwara et al. | 521/116 X |

OTHER PUBLICATIONS

Isocyanurate Foams: Chemistry, Properties and Processing by N. E. Reymore, Jr., P. S. Carleton, R. A. Kolakowski and A. A. R. Sayigh.
Development of Lower Cost Polyurethane Modified Polyisocyanurate and Rigid Foams by Joseph M. Hughes and John L. Clinton.
Hercules Incorporated Technical Information—Bulletin OR-250A.
Hercules Incorporated Technical data—Bulletin OR-255.

*Primary Examiner*—Lucille M. Phynes

[57] ABSTRACT

Low smoke isocyanurate modified polyurethane foams are prepared from polyols and a stoichiometric excess of reactive isocyanates providing an —NCO/—OH index of 1.3–3.0, preferably from 1.6–2.3. Catalysts for the trimerization reaction of the isocyanate to the isocyanurate form are employed. The polyol used in the present invention includes from 5–100% of a digestion product which is prepared by digesting polyalkylene terephthalate residues in organic polyols. The foams produced by the method of the present invention possess unexpected properties in such areas as flame spread, smoke, and low friability. The use of the polyols described above can substantially reduce product cost, allowing the isocyanurate modified polyurethane foams of the present invention to be utilized in commercial applications.

12 Claims, No Drawings

LOW SMOKE ISOCYANURATE MODIFIED URETHANE FOAM AND METHOD OF MAKING SAME

BACKGROUND OF THE INVENTION

1. Field of the Invention

The present invention relates generally to the art of rigid urethane foams and more particularly to isocyanurate modified polyurethane foams in which at least a portion of the polyol component includes a digestion product of polyalkylene terephthalate residue or scrap dissolved in one or more organic polyols.

2. Description of the Prior Art

Rigid polyurethane foams are well known and are commonly prepared from organic polyisocyanates and organic polyols together with known blowing agents, surfactants and catalysts for the reaction of —OH and —NCO radicals. Such foams are used in construction, refrigeration and insulation because they may be prepared in a wide variety of densities and because they are closed cell foams. One of the major factors contributing to the failure of such foams to reach large scale commercial acceptance is that the basic foam systems have high smoke and flame generation ratings when evaluated by ASTM E84. For fire retardant applications, it has been customary to employ halogenated additives and/or halogenated organic polyols. Several problems result from the required use of substantial amounts of halogenated polyols, not the least of which is the greatly increased cost of these fire retardant foams. Further, the toxicity of halogen containing gases which result from the incomplete combustion of urethane or isocyanurate modified urethane foams containing such halogenated materials is a matter of concern. A need exists for low smoke and flame spread polyurethane foams which do not require substantial amounts of such halogenated materials.

One proposed solution to the problem is described in commonly assigned U.S. Pat. No. 4,223,068, issued Sept. 16, 1980 to Carlstrom, et al. for "Rigid Polyurethane Foam Containing Polyester Residue Digestion Product and Building Panel Made Therefrom." In this patent, the rigid polyurethane foam is produced from polyisocyanates and polyols wherein from 5–30% by weight of the polyol ingredient is the digestion product of polyalkylene terephthalate residues or scrap in organic polyols. Urethane foams prepared using such digestion products exhibit uniform density when compared to similar foams which do not contain such products and also show equivalent or superior physical properties. Moreover, and quite unexpectedly, such foams have lower flame spread and smoke generation ratings than corresponding foams prepared without such digestion products. The properties are unexpected in these particular applications because the polyol digestion products are primarily linear diols and would not be expected to yield the strength properties which they in fact do exhibit. Such digestion products minimize the need for more costly halogenated materials and further are advantageous in that they are generally less expensive than virgin polyols used in polyurethane foam preparation.

The 5–30% limitation expressed in the aforementioned Carlstrom patent represents the approximate range for inclusion of such digestion products in typical urethane foam compositions. Higher amounts were found to lead to deterioration of foam properties.

The digestion products according to the aforementioned Carlstrom patent are prepared from polyalkylene terephthalate (PET) scrap which is readily available from photographic films, synthetic fibers and from PET beverage bottles, among other sources. The starting material is also available from sludges obtained as by-products in polyalkylene terephthalate manufacturing plants. Such scrap usually has a molecular weight in the range of 15,000–100,000. The digesting polyols described as being useful by Carlstrom, et al. are those aromatic or aliphatic polyols having a molecular weight of 500 or less and include ethylene glycol, propylene glycol, butylene glycol, diethylene glycol, polyethylene glycol, dipropylene glycol, polypropylene glycol and other ethylene glycols and glycol ethers, hydroxy-terminated polyesters, bis(2-hydroxyethoxyethyl)glutarate and bis(2-hydroxy-ethyl)terephthalate. The digestion reaction is carried out at elevated temperatures, such as 200°–250° C., for several hours and under a nitrogen atmosphere to prevent oxidation reactions. The digested product is cooled and the product is used directly or stored for subsequent use.

Foams prepared using such digestion polyols may be used, for example, in building panels where insulation and fire retardancy are important requisites. Ratings of 25 or less flame spread and 100 or less smoke generation have been obtained for building panels having two incombustible skins using ASTM E84.

Recently, another type of foam has been investigated by various corporate and academic institutions, i.e. the isocyanurate foams. These foams include trimer units formed by the cyclization of the isocyanate (—N=C=O) radicals catalyzed by certain types of oxides, alkoxides, amines, carboxylates, hydrides, and hyroxides of quarternary nitrogen, phosphorus, arsenic and antimony. The basic chemistry of monomeric isocyanurates and the preparation of isocyanurate foams is described in an article "Isocyanurate Foams: Chemistry, Properties and Processing" by Reymore, et al. and published in the *Journal of Cellular Plastics,* Nov/Dec 1975, pp. 328–345. The isocyanurate rings exhibit a high degree of thermal stability, a property which researchers believe can be exploited in the foam field. However, initial research with isocyanurate foams met with failure because the products were extremely friable, probably because of the high cross-link density. Moreover, humid aging properties were quite poor. Various attempts have been made to modify the properties of isocyanurate foams by varying the NCO index in foam preparations as well as by modifying the ring forming or polyol components of the final foam. It is only in recent years that substantial progress has been made in achieving the desired results. Polyol substitution has been attempted, but typically polyol addition results in a decrease in heat stability and an increase in flammability, although the physical properties may be more precisely tailored using polyols.

It has also been recognized as advantageous to use lower cost polyols in the preparation of polyisocyanurate systems. For example, Hughes and Clinton presented a paper entitled "Development of Lower Cost Polyurethane Modified Polyisocyanurate and Polyurethane Foams" at the 25th Annual Urethane Division Technical Conference sponsored by the Society of the Plastics Industry in Scottsdale, Ariz. on Oct. 29, 1979. The work described in this paper included the replacement of conventional polyols with lower cost polyols such as Urol-11 and the Terate polyols. Urol-11 has a hydroxyl number of 400-460, an acidity percent of 0.2, a viscosity (cps at 25° C.) of 5000 and a moisture (wt %) of 0.3 and had previously been employed as a low cost polyol for one-shot polyurethane foam applications. This material has a functionality of about 3 and a molecular weight of about 400.

The Terate polyols are moderate viscosity, aromatic polyester polyols derived from polycarbomethoxy-substituted diphenyls, polyphenyls, and benzyl esters of the toluate family and are manufactured and sold by Hercules Incorporated of Wilmington, Delaware. Hughes and Clinton attempted to improve polyisocyanurates foams with Terates, recognizing that Hercules marketed the Terates as additives useful for enhancing fire retardancy (primarily because of the high aromatic content of the Terates.) It was concluded by these authors that low cost materials such as the Urol-11 and Terate materials could be employed in isocyanurate foam systems without reducing the desired physical properties and at the same time maintaining or enhancing the fire retardancy and smoke generation properties of the resultant foam. The one problem that was encountered in this work was the incompatibility of the Terates with the fluorocarbon blowing agents employed. Balancing with proper surfactants seemed to alleviate this problem and Hercules has now introduced new members of the Terate family for use in polyurethane, quasi-trimer and isocyanurate foams which are claimed to be free of the incompatibility problem. The current literature advocates phosphorus addition (0.75-1.0%) in these foams and an isocyanate index as low as 1.60 when Terates are used at high levels as the polyol foam component.

While the prior art described above demonstrates progress in the development of lower cost, flame retardant polyurethane and isocyanurate modified urethane foams having desirable physical properties, all of the problems of the prior art have not been overcome from the standpoint of system reliability and reproducability. The aforementioned incompatability problems and the sensitive catalyst mechanisms which are involved in the preparation of polyisocyanurates have slowed progress. The development of additional isocyanurate modified urethane foams utilizing low cost polyols and which are able to achieve Class I or II ratings for fire retardancy and which have low smoke generation while maintaining physical properties would be a further significant advance in the art.

OBJECTS AND SUMMARY OF THE INVENTION

It is a primary object of the present invention to provide a rigid isocyanurate modified urethane foam having low smoke and flame spread ratings, desirable physical properties, and which utilize as the polyol component a lower cost polyol material.

Another object of the present invention is to provide such a urethane foam which does not require substantial amounts of costly specialty fire retardants to achieve the low flame spread and smoke generation ratings.

Yet another object of the present invention is to provide such a rigid isocyanurate modified urethane foam system which includes a polyalkylene terephthatate digestion product polyol as the lower cost polyol component while maintaining compatability with halogenated blowing agents.

Still another object of the present invention is to provide such a urethane foam system which may include substantial proportions of such digestion products in the polyol component.

A further object of the present invention is to provide such urethane foam systems which include digestion products using dipropylene glycol or dipropylene glycol adducts as digesting agents.

A different object of the present invention is to provide a method for making such isocyanurate modified urethane foams containing digestion products polyols.

How these and further objects of the invention are accomplished will be described in the following specification, taken in conjunction with the examples presented herewith. Generally, they are accomplished with isocyanurate modified urethane foam formulations having an —NCO index of 1.3-3.0 (preferably 1.6-2.3) by incorporating as the polyol component 5-100% of a digestion product polyol.

DESCRIPTION OF THE PREFERRED EMBODIMENT

The isocyanate materials used for the foam system of the present invention is preferably an organic polyisocyanate which may be a quasi-prepolymer or polymeric isocyanate. Examples of polyisocyanates include polymethylene polyphenylene polyisocyanate and the reaction products thereof with polyester polyols or polyether polyols, such as alkylene oxide adducts of a polyol. One preferred material is Mondur-MR, a polymethylene polyphenylene polyisocyanate having an —NCO value of 31-32. The —NCO values of suitable starting materials for use in the preferred embodiment of the present invention range from about 20-34. Generally, any polymeric isocyanate or isocyanate prepolymer useful for the preparation of urethane foams may be used in the present invention.

Surfactants are typically employed in the preparation of rigid foams of the urethane and isocyanurate type and typically comprise silicone fluids which improve the cell size and uniformity of the foam. The particular surfactant employed in the present invention is DC-193, a silicone fluid manufactured by Dow Corning.

As a catalyst in the present invention can be used any catalyst known to the art for the reaction of the isocyanate groups with the hydroxyl radicals together with a catalyst for the isocyanurate ring formation reaction discussed earlier in this specification. Alternatively, any catalyst can be employed which is capable of catalyzing the simultaneous urethane and isocyanurate reactions. The trimer catalysts used in the following preferred embodiment include Dabco TMR or Dabco TMR-2 (available from Air Products Company) and T-45 (potassium octoate) admixed with Polycat 8, a tertiary amine urethane catalyst manufactured by Abbott Labs. Other amines, such as triethylene diamine and TMBDA (N,N,N',N'-tetramethylbutane diamine) are also commonly used in the production of urethane foams and may be employed herein.

Conventional polyurethane foam blowing agents are used in the preferred embodiments and typically comprise vaporizable liquid halogenated hydrocarbons such as trichlorofluoro-methane sold commercially as Freon-11. The R-11 material referred to in one the following examples is the same blowing agent.

Fire retardant agents may also be employed in the present invention, such as Fryol PCF, a tris-chloropropyl phosphate fire retardant. A similar fire retardant sold by another supplier is known as Antiblaze 80 and is employed in one of the following examples.

The digestion product polyols described in the aforementioned Carlstrom et al patent may be used in the present invention. Other digestion product polyols may also be used including those prepared according to the teachings of said patent and using as the digesting agent polyester polyols prepared from diols or triols in combination with dibasic acids, esters or mixtures thereof, such as adipic acid, succinic acid, glutaric acid and the methyl esters thereof.

In addition to the use of the digestion product polyols which are required in the present invention, conventional polyurethane resin forming polyols may also be employed. Such polyols are sold for this purpose by a large number of manufacturers. In the following examples, Voranol polyols are used along with the specified digestion polyols, i.e. Voranol 370 manufactured by Dow Chemical and Dow Blend 2 which is also manufactured by Dow Chemical and which is believed to be a 50/50 blend of a surose based polyol and an aliphatic amine based polyol. Another Dow polyol is XA 10797, an aromatic amine base polyol.

The present invention is not to be limited to the foregoing examples of isocyanates, surfactants, catalysts, blowing agents, fire retardants or polyols as a large number of products are available from a variety of suppliers for use in polyurethane foam manufacture. These products may be substituted for the specifically identified materials by one skilled in the art after reading this specification and are deemed to fall within the teachings of the present invention.

Proceeding now to a description of the preferred embodiment of the present invention, five examples are provided. Four of the examples illustrate the isocyanurate modified urethane foams of the present invention, while Example V provides a comparison of another such foam using a Terate polyol in place of the digestion product polyol of the present invention.

EXAMPLE I

A rigid isocyanurate modified urethane foam was prepared from the following materials, all weights being parts by weight in the total formulation.

| Component A | MDI (Isocyanate) | 174.0 |
|---|---|---|
| Component B | Digestion Polyol A | 50.0 |
| | Dow Blend 2 | 50.0 |
| | Dabco TMR | 1.8 |
| | T-45 | 0.6 |
| | DC-193 | 2.0 |
| | R-11B | 54.0 |
| | Fryol PCF | 15.0 |

The —NCO/—OH index of the formulation was 1.79 and the total percent polyols was 36.5%. The A/B ratio used to prepare a foam having a density of 1.89 lb/ft$^3$ was 1.0:1.0. The foam exhibited the following properties:

| Compressive Strength | 29.50 |
|---|---|
| Orig K-factor | .125 |
| Humid Aging | core/composite |
| length | 7.9/2.0 |
| width | 3.3/5.3 |
| thickness | 1.3/2.7 |

In E-84 testing of the foam produced in Example I, the foam produced a flame spread rating of 23 and a smoke rating of 380, numbers which are considered desirable for these types of foam products and allow a class I designation to be used for the subject foam.

The digestion polyol A used in Example I was prepared according to the teachings of the aforementioned Carlstrom, et al. patent with the digesting medium consisting of the reaction product of a 2/1 mole mixture of diethylene glycol and dimethyl-glutarate.

EXAMPLE II

A second rigid isocyanurate modified urethane foam formulation was prepared as follows:

| Component A | Polymeric Isocyanate | 80.0 |
|---|---|---|
| Component B | Voranol 370 | 31.4 |
| | Digestion Polyol B | 31.4 |
| | Antiblaze 80 | 9.0 |
| | DC-193 | 1.2 |
| | Dabco TMR - 2 | 1.5 |
| | Polycat 8 | 0.5 |
| | Freon 11B | 25.5 |

This formulation has an —NCO/—OH index of 1.8 and exhibited a flame spread of 23 and a smoke rating of 237 when tested as a 3 lb/ft$^3$ foam in ASTM E-84. These results also allow a class I rating to be applied to the Example II foam. These results are unexpected, in as much as a class I rating is more difficult to achieve with a higher density foam.

The digestion polyol B employed in this formulation is a novel material prepared according to the general teachings of the aforementioned Carlstrom, et al. patent. It actually comprises a 50/50 mixture of two separate digestion polyols, i.e. a first digestion polyol which was described as digestion polyol A in Example I and a second digestion polyol in which the digesting medium comprises the reaction product of a 2/1 mole mixture of dipropylene glycol and dimethyl glutarate. This second digestion polyol has also been found to be useful as the sole digestion polyol in the formulation of isocyanurate modified urethane foams.

EXAMPLE III

| Component A | Mondur MR | 75.0 |
|---|---|---|
| Component B | Dow Blend 2 | 29.8 |
| | Digestion Polyol A | 29.8 |
| | Antiblaze 80 | 4.0 |
| | Dabco TMR | 1.2 |
| | DC-193 | 1.0 |
| | Freon 11 | 34.0 |

This formulation has an —NCO/—OH index of 1.62 and was tested at 2 inch thickness having a density of 2.4 pcf. It exhibited a flamespread of 35.65 and smoke generation of 285, providing a Class II rating.

EXAMPLE IV

| Component A | Mondur MR | 123.00 |
|---|---|---|
| Component B | XA 10797.00 | 52.88 |
| | Digestion Polyol A | 17.62 |
| | DC-193 | 1.50 |
| | Dabco-TMR | 1.00 |
| | Freon-TMR | 27.00 |

This formulation has an —NCO/—OH index of 2.30 and was tested at a 2 inch thickness having a density of 3.0 pcf. It exhibited a flamespread of 28.05 and a smoke generation of 399, very desirable Class II numbers, especially since the Example IV foam does not contain halogenated fire retardants.

EXAMPLE V

A fifth isocyanurate modified urethane foam was prepared and included the following:

| Component A | Polymeric Isocyanate | 81.0 |
| --- | --- | --- |
| Component B | Voranol 370 | 31.5 |
| | Terate 203 | 31.5 |
| | Antiblaze 80 | 9.0 |
| | DC-193 | 1.25 |
| | Dabco TMR-2 | 1.5 |
| | Polycat 8 | 0.5 |
| | Freon 11B | 25.0 |

The —NCO/—OH index of this formulation was 1.6 and the foam produced flame spread and smoke ratings of 30 and 220 respectively when tested using ASTM E-84. The Terate material has been described earlier in the specification. Its use in Example III gave only class II burning results by ASTM-84.

The isocyanurate modified urethane foams of the present invention can be employed in a wide variety of applications, including those where unmodified urethanes have been used. They are especially useful in formulating building panels where the foam is applied to one or between two incombustible skins. The foams according to the present invention may be prepared at lower cost than comparable foams without the digestion product polyol while maintaining unexpected flame spread and smoke generation ratings.

While the present invention has been described by reference to four specific examples, the invention is not to be limited thereby, but is to be limited solely by the claims which follow.

We claim:

1. An isocyanurate modified urethane foam formed by reacting an organic isocyanate and an an organic polyol in the presence of a halogenated blowing agent, the —NCO/—OH index of said reactants being between 1.3 and 3.0 and wherein as a catalyst for said reaction is employed one or more catalysts capable of causing the reaction of isocyanate and hydroxyl radicals to form a polyurethane and of causing a trimerization reaction of the excess isocyanate radicals to produce the isocyanurate modification of said urethane foam and wherein from about 5%–100% of the polyol employed in said foam reaction consists of a digestion product obtained by digesting polyalkylene terephthalate in a reactive solvent selected from the class consisting of organic diols and triols having an average molecular weight of from 62–500.

2. The invention set forth in claim 1 wherein the reactive solvent used to prepare the digestion product polyol is selected from the group consisting of diethylene glycol, dipropylene glycol and reaction products of mixtures thereof with dimethyl glutarate.

3. The invention set forth in claim 2 wherein the reactive solvent comprises at least in part dipropylene glycol.

4. The invention set forth in claim 1 wherein the —NCO/—OH index of the reactants is between 1.6–2.3.

5. The invention set forth in claim 1 further including at least one surfactant.

6. The invention set forth in claim 1 further including at least one fire retardant chemical composition.

7. A method for making rigid polyurethane foam which comprises combining:
   a. an organic polyisocyanate;
   b. an organic polyol;
   c. a blowing agent; and
   d. a catalyst system suitable for the reaction of —NCO radicals and the reaction of isocyanate groups to form isocyanurate trimer entities, wherein the —NCO/—OH index is between 1.3–3.0 and wherein between about 5% to 100% of said organic polyol consists of the digestion product obtained by digesting polyalkylene terephthalate in a reactive solvent selected from the class consisting of organic diols and triols having a molecular weight from about 62–500.

8. The invention set forth in claim 7 wherein the reactive solvent used to prepare the digestion product polyol is selected from the group consisting of diethylene glycol, dipropylene glycol, and reaction products of mixtures thereof with dimethyl glutarate.

9. The invention set forth in claim 8 wherein the reactive solvent comprises at least in part dipropylene glycol.

10. The invention set forth in claim 7 wherein the —NCO/—OH index of the reactants is beween 1.7–2.3.

11. The invention set forth in claim 7 further including at least one surfactant.

12. The invention set forth in claim 7 further including at least one fire retardant chemical composition.

* * * * *

Notice of Adverse Decision in Interference

In Interference No. 101,456, involving Patent No. 4,417,001, G. R. Svoboda, W. L. Carlstrom and R. T. Stoehr, LOW SMOKE ISOCYANURATE MODIFIED URETHANE FOAM AND METHOD OF MAKING SAME, final judgment adverse to the patentees was rendered Sept. 11, 1986, as to claims 1–12.

[*Official Gazette December 2, 1986.*]